(12) United States Patent
Plazotta et al.

(10) Patent No.: US 10,486,762 B2
(45) Date of Patent: Nov. 26, 2019

(54) MOTORCYCLE HAVING AN INTERNAL COMBUSTION ENGINE AND A CONTAINER FOR RECEIVING FUEL VAPOR FROM THE FUEL TANK

(71) Applicant: KTM AG, Mattighofen (AT)

(72) Inventors: Bernhard Plazotta, Oberndorf (AT); Maximilian Schönberger, Pfaffstätt (AT)

(73) Assignee: KTM AG, Mattighofen (AT)

( * ) Notice: Subject to any disclaimer, the term of this patent is extended or adjusted under 35 U.S.C. 154(b) by 30 days.

(21) Appl. No.: 15/498,189

(22) Filed: Apr. 26, 2017

(65) Prior Publication Data

US 2018/0312209 A1 Nov. 1, 2018

(51) Int. Cl.
| | |
|---|---|
| *B62J 35/00* | (2006.01) |
| *B62K 11/04* | (2006.01) |
| *F02M 25/08* | (2006.01) |
| *B62K 19/30* | (2006.01) |
| *B60K 15/035* | (2006.01) |
| *B60K 15/01* | (2006.01) |

(52) U.S. Cl.
CPC ......... *B62J 35/00* (2013.01); *B60K 15/03504* (2013.01); *B62K 11/04* (2013.01); *B62K 19/30* (2013.01); *F02M 25/089* (2013.01); *F02M 25/0836* (2013.01); *F02M 25/0854* (2013.01); *B60K 15/013* (2013.01); *B60K 2015/03514* (2013.01); *B60Y 2200/12* (2013.01)

(58) Field of Classification Search
CPC .......... B62J 35/00; B62K 11/00; B62K 11/04; F02M 25/0836; F02M 25/0854; F02M 25/089
See application file for complete search history.

(56) References Cited

U.S. PATENT DOCUMENTS

| | | | | |
|---|---|---|---|---|
| 8,113,312 B2 * | 2/2012 | Seki | ......................... | B62J 37/00 180/216 |
| 8,210,302 B2 * | 7/2012 | Mori | ........................ | B62J 35/00 123/519 |
| 8,215,677 B2 * | 7/2012 | Hosoya | .................... | B62J 37/00 180/69.4 |

(Continued)

FOREIGN PATENT DOCUMENTS

| | | |
|---|---|---|
| DE | 2012 204 881 A1 | 10/2012 |
| EP | 2 258 938 B1 | 12/2010 |
| EP | 2 279 936 B1 | 2/2011 |

OTHER PUBLICATIONS

KTM AG, "Super Duke GT, XC-W and EXC-F," public PowerPoint® Presentation by KTM AG to selected invitees; no earlier than Jun. 1, 2017 in Mattighofen, Austria, pp. 1-62 (p. 39).

*Primary Examiner* — Joseph M Rocca
*Assistant Examiner* — Michael R Stabley
(74) *Attorney, Agent, or Firm* — Rod D. Baker (57) ABSTRACT

A motorcycle having a combustion engine and a throttle valve device, a fuel tank, and a canister for receiving fuel vapor from the fuel tank. There is disclosed an apparatus and system for use on such a motorcycle, the apparatus and system having a conduit arrangement for passing fuel vapor from the fuel tank to the canister, and from the canister to the throttle valve device, and featuring a motorcycle frame with at least one frame tube. The frame tube has an inner recess, and at least a portion of the canister is arranged in the inner recess of the frame tube.

19 Claims, 10 Drawing Sheets

(56) References Cited

U.S. PATENT DOCUMENTS

| | | | | |
|---|---|---|---|---|
| 8,251,048 B2* | 8/2012 | Kusa | B60K 15/03504 | 123/518 |
| 8,256,557 B2* | 9/2012 | Suzuki | B62J 35/00 | 180/219 |
| 8,316,979 B2* | 11/2012 | Seki | B60K 15/03504 | 180/219 |
| 8,327,964 B2* | 12/2012 | Inaoka | B60K 13/02 | 123/519 |
| 8,439,146 B2* | 5/2013 | Tanaka | B60K 15/03504 | 180/219 |
| 8,899,367 B2* | 12/2014 | Hayashi | B62J 35/00 | 123/519 |
| 9,695,783 B2* | 7/2017 | Tsubone | F02M 25/0854 | |
| 2014/0060955 A1* | 3/2014 | Kono | F02M 35/162 | 180/291 |
| 2016/0009329 A1* | 1/2016 | Tsubone | B62J 37/00 | 180/229 |
| 2016/0010599 A1* | 1/2016 | Tsubone | F02M 25/0854 | 123/520 |
| 2016/0185211 A1* | 6/2016 | Nakamura | F02B 61/02 | 180/233 |

* cited by examiner

MOTORCYCLE HAVING AN INTERNAL COMBUSTION ENGINE AND A CONTAINER FOR RECEIVING FUEL VAPOR FROM THE FUEL TANK

BACKGROUND OF THE INVENTION

Field of the Invention

The present invention relates to a motorcycle having a combustion engine and a throttle valve device and a fuel tank, having a container for receiving fuel vapor from the fuel tank, and more particularly to a conduit arrangement for feeding fuel vapor from the fuel tank to the container and from the container to the throttle valve device; the motorcycle has a motorcycle frame with at least one frame tube.

Background Art

In the fuel tank of a motorcycle, fuel vapors accumulate, which for reasons of environmental protection are not permitted to be simply discharged into the environment. Rather, the fuel vapors preferably are passed via a conduit arrangement into a container where they are collected, and (when the combustion engine of the motorcycle is operated) are fed via the conduit arrangement of the throttle valve device to be combusted by the internal combustion engine.

The throttle valve device can be a throttle valve of a fuel injection system, or another device for forming and feeding a fuel-air mixture to the combustion engine, such as a carburetor. The container can include a loose bulk material consisting of porous fine-pored carbon or activated charcoal, which first binds the fuel vapors, and the container can then, for example, be flushed at a later point in time in order to feed the fuel vapors in a controlled manner by way of a valve element to the throttle valve device to be combusted by the combustion engine. Such a container is often also referred to as a canister, and must be mounted on the motorcycle.

In European Patent Specification EP 2 279 936 B1 a device for treating vaporized fuel for motorcycles has been disclosed. The device comprises a canister filled with activated charcoal, which is arranged on the motorcycle viewed from the side in the area between the instrument cover and the fuel tank, namely inside a frontal side fairing of the motorcycle, wherein a bulge is provided on the frontal side fairing, in which the canister can be arranged inside the frontal side fairing. For this purpose a tab is provided, which is permanently welded onto a fairing holder, so that the canister can be fixed on the tab by means of bolts. The publication makes clear that such an arrangement on the motorcycle requires the arrangement of fairing holders, so that this configuration is only applicable in motorcycles which have at least one frontal side fairing.

In European Patent Specification EP 2 258 938 B1 a motorcycle has been disclosed, which comprises a canister for receiving fuel vapors arranged underneath the fuel tank and specifically, viewed from the side, in the area between the cylinder head of the engine of the motorcycle and a laterally lowered sidewall of the fuel tank. The canister is visible from the side of the motorcycle and thus affects the visual appearance of the motorcycle; in order to cover the canister in the known motorcycle a frontal side fairing is arranged that hides the canister and thus removes it from the field of view of the user of the vehicle or third parties.

This description makes clear that hiding the canister, even in a motorcycle which otherwise lacks fairing, requires additional effort.

On the basis of U.S. Pat. No. 8,210,305 B2 a support structure for a canister on the motorcycle has been disclosed, which is characterized by the fact that the canister is mounted on a surface of the fuel tank which slopes away to the rear when viewed in the driving direction of the motorcycle, and is covered from above by the seat of the motorcycle. The description makes clear that the sloping surface must be applied to the fuel tank, which means that the capacity of the fuel tank for holding fuel is reduced.

German Patent Specification DE 10 2012 204 881 A1 discloses an arrangement structure of a canister on a motorcycle, which is characterized by the fact that, when viewed in the driving direction of the motorcycle, the canister is arranged between main frame tubes of the frame of the motorcycle that extend to the rear and a cylinder of the combustion engine of the motorcycle, namely behind the intake system. As a result, existing dead space on a motorcycle is utilized, but this presupposes that the intake system is positioned at the front, viewed in the driving direction of the motor cycle, and that installation space for receiving the canister or container is available above the cylinder of the engine, which in turn requires an almost horizontal arrangement of the cylinder. Therefore, use in a motorcycle with a different position of the cylinder, for example one that is only slightly tilted forwards or stands vertically, is excluded.

SUMMARY OF THE DISCLOSURE

An object of the present invention is to provide a motorcycle having a combustion engine, a throttle valve device and a fuel tank and a canister for receiving fuel vapor from the fuel tank. There is disclosed such a motorcycle in which existing installation space on the motorcycle for receiving the container, which normally remains unused as dead space, is used, and in addition the container does not adversely affect the appearance of the motorcycle.

There is provided a motorcycle apparatus having a combustion engine and a throttle valve device, a fuel tank and a canister for receiving fuel vapor from the fuel tank, and having a conduit arrangement for passing fuel vapor from the fuel tank to the canister and from the canister to the throttle valve device. The motorcycle apparatus includes a frame having at least one frame tube, wherein the frame tube is fitted with an inner recess and at least some sections of the canister are arranged in the inner recess of the frame tube.

The motorcycle according to the invention is therefore characterized in that the container for receiving fuel vapor from the fuel tank, i.e. the canister, at least in some of its sections or portion, is arranged in an inner recess of a frame tube of the motorcycle frame of the motorcycle according to the present disclosure. The result obtained by the arrangement, or at least sectional arrangement, of the canister in the inner recess of the frame tube, which can be, for example, a hollow space already existing in the frame tube to which the container is matched, is that the canister may be inserted or installed into the frame tube, for example during the assembly of the motorcycle. After assembly, the canister no longer affects the visual appearance of the motorcycle, i.e., it is arranged in a concealed position on the motorcycle and moreover is protected against damage. The canister thus is arranged on the motorcycle in a tamper-proof manner, thus being not openly accessible by, for example, simply detaching a frontal side fairing on the motorcycle and therefore being secured against a simple unauthorized removal.

In addition, the canister arranged inside of the frame tube is protected against an inadmissible temperature rise due to solar radiation. The canister is mounted on the motorcycle in a crash-protected way. Advantageously, the canister can be pre-assembled on the motorcycle frame prior to the assembly of the motorcycle in an assembly-friendly manner for production, i.e. installed in the frame tube, so that during the assembly of the motorcycle all that needs to be fitted is the conduit arrangement from the fuel tank to the canister and from the canister to the throttle valve device.

Due to the arrangement of the canister or container in a frame tube of the motorcycle frame in the immediate vicinity of the fuel tank, a short conduit arrangement can be designed in the form of a hose for feeding fuel vapor from the fuel tank into the container or canister, thereby also achieving a structure of the conduit arrangement that protects it against damage from stones or other debris thrown up from the road, which is particularly advantageous if the motorcycle is used off-road or in off-road sports activities.

The arrangement of the canister or container at least partially in the frame tube of the motorcycle frame is generally advantageous in motorcycles, since the available installation space for the arrangement of the canister on the motorcycle is extremely low. According to the configuration of this disclosure, an extra space for the canister does not need to be specially created. In addition, in particular in the case of off-road sport motorcycles, available space for the arrangement of the canister on the motorcycle is extremely limited, because such a motorcycle typically does not have space-occupying fairing in which the canister might be hidden, as is the case in many motorcycles.

The arrangement of at least some portions of the vapor container in the inner recess of the frame tube, according to the present disclosure, means that the container or canister is installed or inserted or introduced into the frame tube with at least a part of its housing, and therefore a part of the canister's housing can also still protrude out of the frame tube, while the canister is preferably arranged entirely within the frame tube.

According to one embodiment of the apparatus according to this disclosure, it is provided that the frame tube that receives the container or canister comprises an opening, through which at least a section or portion of the container can be inserted into the inner recess. This allows the container to be inserted into the inner recess of the frame tube through the opening during the assembly of the motorcycle frame, so that a pre-assembly of the motorcycle frame is possible and the container can be removed from the inner recess of the frame tube through the opening, to allow maintenance work or the like.

It is also provided according to an embodiment of the apparatus that, at least in some sections, the container is designed to be, or defines a section which is, shape- and surface-complementary to the inner recess of the frame tube. The inner recess itself has an interior surface surrounding or defining its interior space, the space into which at least a portion of the container is insertable. This configuration, wherein the exterior contour of the container matches the interior contour of the frame tube, enables the container to be inserted into the inner recess of the frame tube with a positive fit, so that it (or a portion of it) needs only to be simply introduced or inserted into the inner recess through the opening and fixed in position there without any further supports or the like. This advantageously eliminates the need to arrange additional supports or tabs on the frame of the motorcycle.

According to one embodiment of this apparatus, it also is provided that the container has a housing with a housing internal recess and that the housing has an elongated shape; the housing inner recess is closed with a cover at least at one end region of the housing, and the housing is fitted with at least one opening for the intake and/or escape of fuel vapor.

Thus a bulk material, for example one consisting of or including activated charcoal, can be introduced into the inner recess of the housing during the production of the container or canister. The bulk material is prevented from penetrating or escaping out of the at least one opening for the intake and/or escape of fuel vapor via filter elements. The elongated shape of the housing ensures that the canister can be inserted, for example, into a breast tube or top-frame tube of the motorcycle frame, and that the bulk material has sufficient capacity for holding fuel vapor. The housing can comprise an opening for allowing fuel vapor to enter the canister and an opening for the escape of fuel vapor from the canister in the direction of the throttle valve device, or else just one opening. If just one opening is provided, it is connected via a valve that can be controlled in such a way that fuel vapor can both enter and escape through the valve.

According to an embodiment of the apparatus of this disclosure, the container also is provided with at least one connection device that is designed for receiving a connection means that can be connected to a conducting means of the conduit arrangement. The connection means is designed for arrangement through a passage of the frame tube for engaging with the connection device. The connection device can be, for example, an internally threaded socket arranged on the housing of the canister or container, into which can be screwed a connection means in the form of a screw fitting, to which in turn a hose can be fixed which, for example, carries a fuel vapor from the fuel tank into the housing of the canister. During the assembly of the canister in the frame tube, the canister is pushed through the opening into the frame tube until the internally threaded socket of the canister overlaps with an opening or drilled hole provided in the frame tube, through which the screw fitting can be inserted and screwed together with the internally threaded socket of the canister, forming a seal.

Thus, for example, three internally threaded sockets can be provided on the housing of the canister, into which after the arrangement of the canister in the frame tube, three screw fittings can be screwed, after being passed through three openings or drilled holes of the frame tube of the motorcycle frame. Connection means in the form of hoses can then be fixed to the three screw fittings, one of said hoses passing or conveying the fuel vapor from the fuel tank towards the canister, one passing or conveying the fuel vapor from the canister in the direction of the throttle valve device, controlled, for example, by a corresponding valve, and one hose being connected to the atmosphere, so that to flush the internal volume of the canister and to equalize the pressure in the canister, air can flow via a one-way valve from the environment back into the canister.

According to another embodiment of the apparatus it is provided that the screw fitting or fittings each have an outer thread, which can be screwed to the internal threaded socket or to the connection device of the housing in a fluid-tight manner; the screw fitting additionally may have a stop surface designed to rest against an outer surface of the frame tube. In this way, for mounting the screw fitting to the connection device, the screw fitting only has to be inserted through the drilled hole in the frame tube and then screwed together with the internal threaded socket until the stop surface on the screw fitting rests on the outer surface of the frame tube. Therefore, on the one hand the connection between the screw fitting and the internal threaded socket is fluid-tight, and on the other hand, a defined position of the screw fitting relative to the motorcycle frame is achieved.

The screw fitting can also provide a shoulder, which comes into contact with a stop surface formed on the container for creating a fluid-tight configuration between the screw fitting and the container.

According to an embodiment of the apparatus it also is provided that the container has an outer contour which is designed to be fixed to the inner recess of the frame tube without an additional retaining device. The container can thus be fixed, for example, in the internal space or inner recess of the frame tube with a snug fit, and to this end, the container is designed with an outer contour which is matched to the inner recess of the frame tube.

The inner recess of the frame tube may define, for example, a rectangular-shaped cross section, with an elongated internal space. The housing of the container may be matched to this configuration, so that the container or canister has a housing with an elongated, sleeve-shaped body, which is closed with a cover at each of its end regions, in which a connecting device in the form of at least one internally threaded socket is arranged. The arrangement is such that one of the above-mentioned screw fittings can be screwed into each internal threaded socket after the container has been inserted through the opening provided in the frame tube into the inner recess of the frame tube.

To the screw fitting or fittings, conducting or conveying means in the form of hoses can then be fixed, through which the fuel vapor can be passed or conveyed into the container and can then be directed from the container in the direction of the throttle valve, or the carburetor, of the drive motor of the motorcycle for combustion.

The fuel vapor originating from the fuel tank is passed via the hose connection to the interior of the container, where it is absorbed by the bulk material with activated charcoal and can later be passed or conveyed through a passage for the escape of fuel vapor from the bulk material, or from the housing of the canister, via a hose connection in the direction of the throttle valve device; for this purpose a controllable valve can be arranged in the hose connection between the outlet of the canister and the throttle valve device. The controllable valve is activated, for example, by an engine control device of the combustion engine, in such a way that the fuel vapor is only fed to the combustion engine at a suitable operating time.

According to an embodiment of the apparatus it also is provided that the motorcycle frame includes a steering head bearing tube and at least one frame tube, which frame tube extends away from the steering head tube and is fitted with the inner recess, in which recess the container or canister can be arranged. The frame tube can be, for example, an underslung frame tube extending away from the steering head bearing tube, or a breast tube, or else a top-frame tube extending away from the steering head bearing tube, which defines an inner recess for receiving the canister.

Because both the breast tube and the top-frame tube are arranged close to the fuel tank of the motorcycle, a corresponding hose connection between the fuel tank and the container or canister can be short in length. This results in a packaging advantage, since the hose connection does not clash with other components on the motorcycle frame. Such a configuration is particularly advantageous for motorcycles which are used in off-road racing or off-road activities, as in such vehicles the manufacturer is always aiming to keep the mass of the motorcycle to a minimum. It is therefore a disadvantage if a mounting surface in the form of tabs or the like must be created for accommodating the canister on a motorcycle, because on the one hand, the dead weight of the vehicle is increased and, in the case of an unprotected open arrangement of the canister on the tab, there is a risk of damage to the canister.

All these disadvantages are eliminated by the system configuration according to the present disclosure. By means of the arrangement in a frame tube of the motorcycle frame of the motorcycle, the canister is crash-protected. With the arrangement of the canister in the area of the fuel tank, there is no longer a need to create a clearance or recess on the fuel tank necessary for receiving the canister, which also achieves the additional advantage that, due to the elimination of the clearance, the capacity of the fuel tank is increased.

The arrangement of the canister in the frame tube of the motorcycle frame also has the advantage that the canister is protected against free unimpeded access by third parties or a user of the motorcycle, and thus any tampering with the canister is prevented, or made more difficult.

The container can be matched to the frame tube, for example in the form of the breast tube or tube or top-frame tube or tube, of the motorcycle frame and no additional retaining devices are necessary for fixing the canister to the motorcycle—which would disadvantageously increase the dead weight of the motorcycle and also in the case, for example, of a holder made of an elastomer for receiving the canister, advantageously would not be subject to an ageing process that could result in breakage of the holder.

The arrangement of the canister in the frame tube also has the advantage of ease of assembly during vehicle production, because the motorcycle frame together with the canister can be kept ready on the production line for manufacturing the motorcycle, already pre-assembled.

The container or canister can be easily fabricated and deployed as an injection-molded part from a plastic material. The canister thus may be designed with threaded sockets designed to receive screw fittings, to which the connections or tubes can be fixed, so that due to the assembly of the screw fittings in the threaded sockets, a fluid-tight configuration is created that does not require additional sealing devices.

By screwing in the screw fitting or fittings into the threaded socket or sockets of the container or canister, a fluid-tight configuration is automatically achieved, and due to the fixing of both the canister relative to the frame tube and of the screw fitting with its stop surface relative to the frame tube, a configuration is provided that prevents any relative movement between canister and screw fittings. Advantageously, therefore, the fluid-tight connection remains fluid-tight even after a long operating time of the motorcycle according to this disclosure.

The system and apparatus will now be described in more detail by reference to the drawing.

DETAILED DESCRIPTION OF THE INVENTION

Figures 1, 1A:
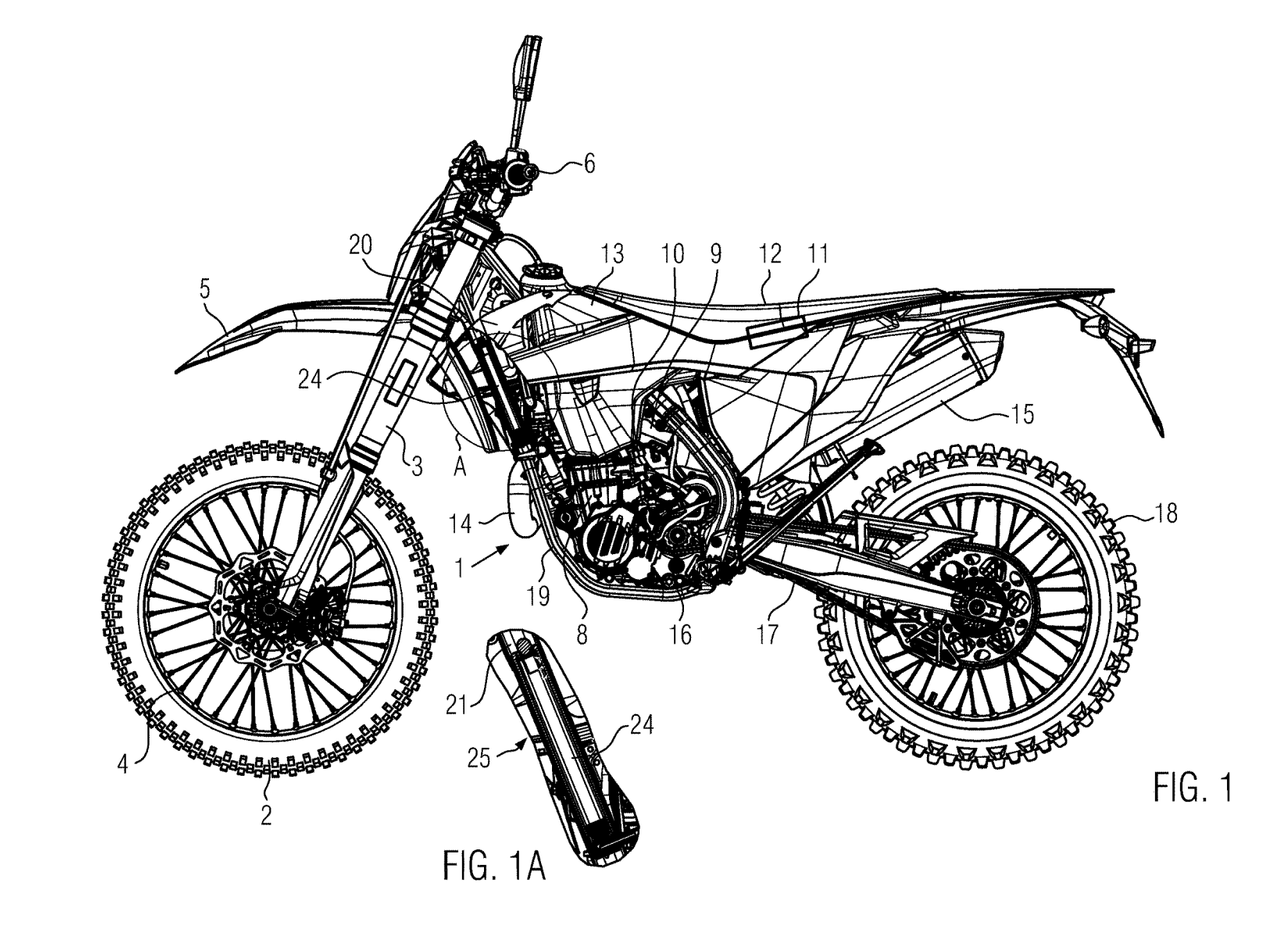
FIG. 1 is a side view of a motorcycle having a container in a frame tube extending away from the steering head bearing tube.
FIG. 1A is an enlarged view of the detail "A" of FIG. 1.

FIG. 1 of the drawing shows a perspective view of a motorcycle 1 in the form of an off-road racing motorcycle, having a front wheel 2, which is arranged and guided on a front fork 3 and can be braked via a front wheel brake 4. In addition, the motorcycle 1 includes a front mudguard 5 and a handlebar 6, which is connected to the front fork 3, so that the front fork 3 can be rotated or pivoted using the handlebar 6, namely on a steering head bearing tube 7. The head bearing tube is more clearly apparent in FIG. 2 in the drawing, in which the front fork 3 is pivotably mounted via roller bearings in the form of, for example, tapered roller bearings (which are not shown in detail). The motorcycle 1 additionally features a drive motor in the form of a combustion engine 8, which in the case of the motorcycle 1 shown is designed as a single-cylinder engine which operates according to the four-stroke principle.

The combustion engine 8 is supplied with a fuel-air mixture via a throttle valve device 9, a fuel injection system 10 being provided for this purpose, which is controlled by an engine control unit 11, which in the motorcycle 1 shown is arranged underneath the driver's saddle or seat 12. By means of an appropriate activation of a rotary throttle handle arranged on the handlebar 6 and not shown in detail, the driver of the vehicle can control the power behavior of the combustion engine 8.

In a fuel tank 13, fuel is stored for the operation of the combustion engine 8 and, via a fuel pump (not shown in detail), is fed to the fuel injection system. After fuel combustion the exhaust gas is discharged through an exhaust pipe 14 and a silencer. The drive power provided by the combustion engine 8 is transmitted via a gear box 16 changing gears and a drive chain 17 to the rear wheel 18 and used to propel the motorcycle 1.

Figure 2:
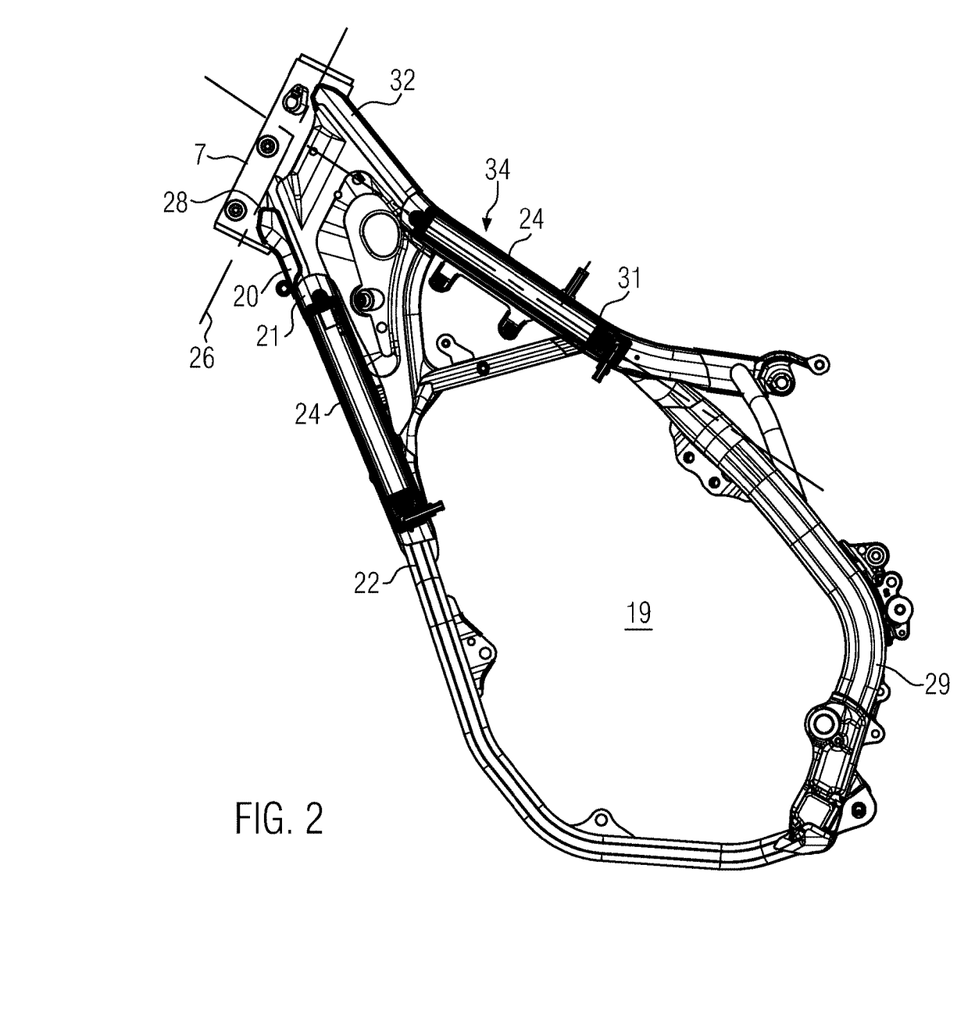
FIG. 2 is a side view of a motorcycle frame, in which two positions are shown for receiving the container on the frame, namely in the breast tube and/or in the top-frame tube.
Figure 3:
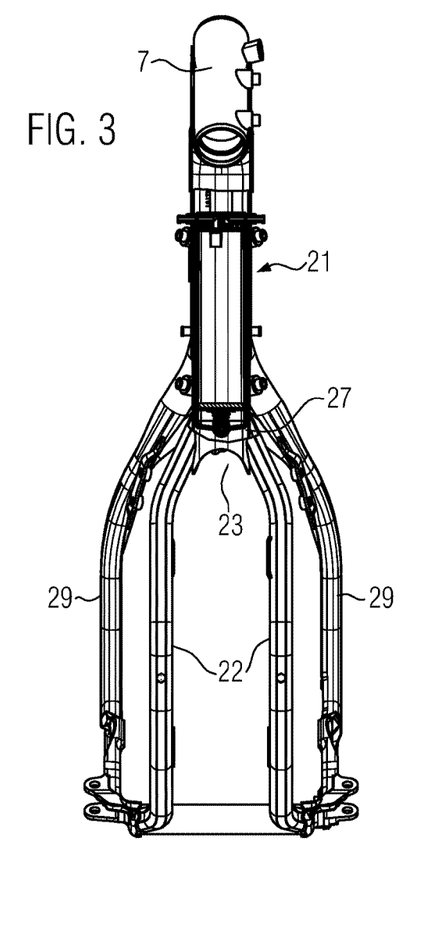
FIG. 3 is a front view of the frame onto the area having the steering head bearing tube, which also shows the container arranged in the breast tube.
Figure 4:
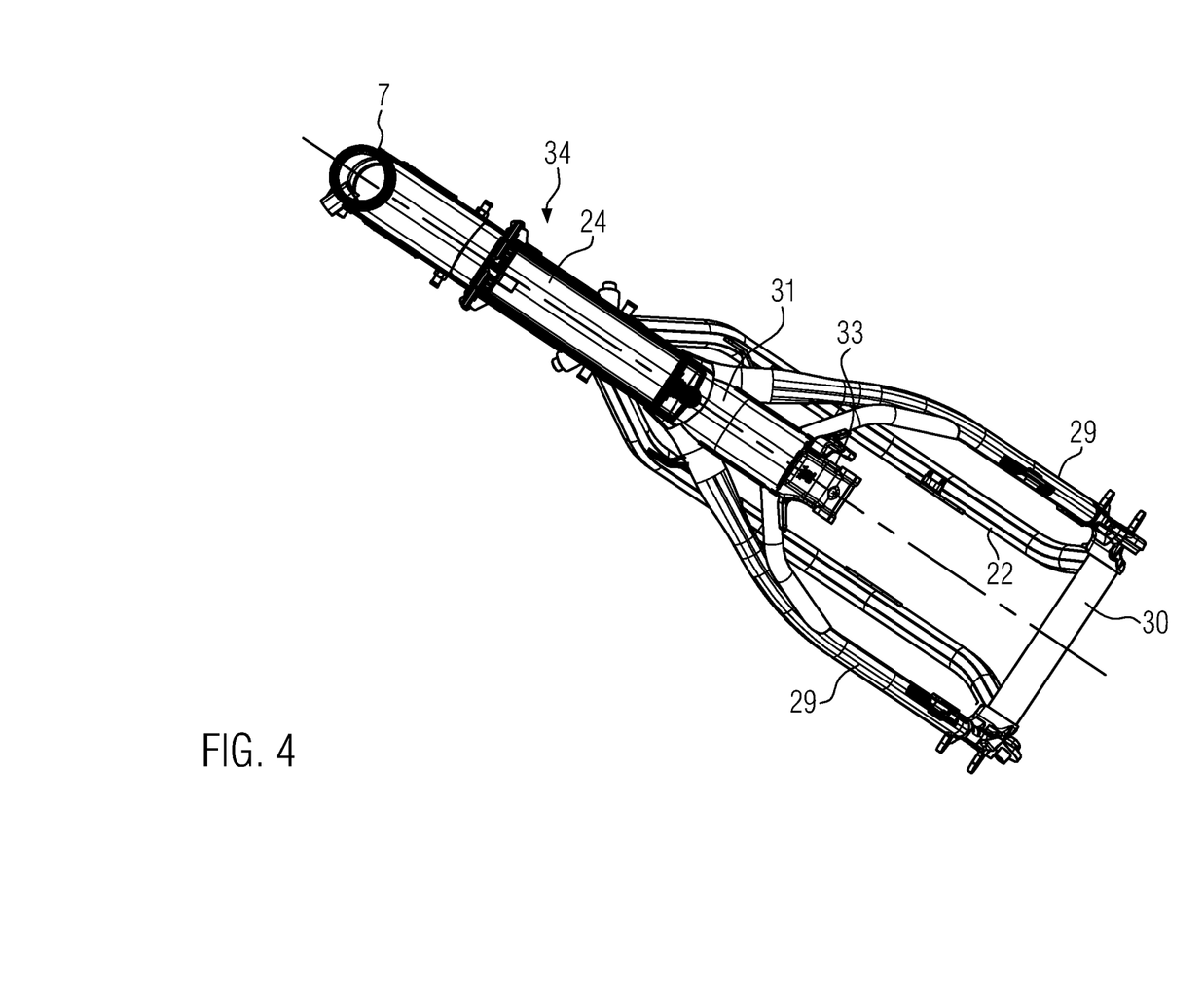
FIG. 4 is a top view of the frame, showing the area having the top-frame tube, which also shows the container arranged in the top-frame tube.

As is readily apparent on the basis of the drawing of FIG. 1, the motorcycle 1 additionally comprises a motorcycle frame 19, which is more apparent on the basis of FIGS. 2-4 of the drawing and is designed as a supporting element for holding the combustion engine 8. The motorcycle frame 19 includes, among other items, a frame tube in the form of a breast tube 21. As apparent in more detail on the basis of FIG. 3 of the drawing, the breast tube 21 extends from the two underslung frame tubes 22, visible in FIG. 3 of the drawing, into the area of the steering head bearing tube 7. At the end region arranged opposite the steering head bearing tube 7, the frame has an opening or recess 23, through which a container 24 for receiving fuel vapor from the fuel tank 13 can be inserted, at least partially, into the frame tube in the form of the breast tube 21.

Referring to FIG. 1A, the container 24 is seen arranged in an inner recess 25 of the breast tube 21. For this purpose the container 24 is configured, both in terms of its size, contoured shape, and in terms of its contact surfaces provided for contacting the inner recess 25, to be complementary to the frame tube or breast tube 21 or the inner recess 5.

The arrangement of the container 24 in the inner recess of the breast tube 21 achieves the advantage that an otherwise unused dead space on a motorcycle 1 is used for holding the container 24, and the container 24 does not affect the visual appearance of the motorcycle 1. The container 24 accordingly also is arranged on the motorcycle 1 in a crash-safe manner and secure against damage, and for example cannot be struck by stones or the like that are thrown up by the front wheel 2.

The arrangement of the container 24 in the breast tube 21 furthermore has the additional advantage that no separate installation space has to be created on the motorcycle 1 to accommodate the container 24. The clearance or pocket recess in the fuel tank 13 as is necessary in the known art also is eliminated, so that the fuel storage capacity is not reduced due to the need to locate the container 24.

The integration of the container 24 within the frame tube 20 or breast tube 21 also has the advantage that the container 24 is mounted on a motorcycle 1 secure against manipulation, since the container 24 cannot simply be pulled out of the frame tube 20 through the opening 23; the opening 23 preferably is blocked off by the exhaust pipe 14, and it thus is necessary at least to disconnect the exhaust pipe 14 before the opening 23 of the breast tube 21 is accessible.

Additionally, the container 24 is matched to the configuration (shape and size), for example to the cross-sectional design, of the breast tube 21. Consequently, the container 24, after having been partially or fully introduced or inserted into the breast tube 21, preferably is securely held in the breast tube 21 without the need for additional retaining devices, such as tabs or the like, having to be fitted to the motorcycle frame 19. The integration of the container 24 in the breast tube 21 thus offers the additional advantage of the simplification of the production of the motorcycle frame 19.

FIG. 2 of the drawing shows a side view of the motorcycle frame 20, which is used for the motorcycle 1. As is apparent, the breast tube 21 extends from the steering head bearing tube 7, starting at an angle of approximately 50 degrees to the longitudinal central axis 26 of the steering head bearing tube 7, in a downward direction to the lower end region 27, (which is opposite the upper end region 28, where the breast tube 21 is connected to the steering head bearing tube 7); the lower end region 27 is connected to two underslung frame tubes 22, as indicated in FIG. 3 of the drawing.

The underslung frame tubes 22, together with two further frame tubes 29 that are each connected to one underslung frame tube 22, form a frame loop, wherein one frame tube 29 is respectively coupled with one underslung frame tube 22, specifically in the region of a swinging-fork pivot tube 30. The other two frame tubes 29 then extend in an upward direction, as illustrated by FIGS. 2-4, to the steering head bearing tube 7 and, specifically, as far as a top-frame tube 31. The upper end region 32 of the top-frame tube 31 is connected in turn to the steering head bearing tube 7 and, in the case of the particular embodiment shown, at an angle of approximately 20 degrees.

FIG. 2 in the drawing shows the container 24 as it is held in the breast tube 21 of the motorcycle 19. FIG. 2 additionally shows a possible alternative arrangement of the container 24 in a frame tube 20 of the motorcycle frame 19, namely in the top-frame tube 31. It is also entirely possible for two containers 24 for receiving fuel vapor from the fuel tank 13 to thusly be arranged on the motorcycle frame 19, this being selected in accordance with a particular application case. If only one container 24 is required on the motorcycle frame 19, then according to the present disclosure, instead of being accommodated in the breast tube 21, it is also feasible for the container 24 to be arranged in the top-frame tube 31. The location of the container 24 in the top-frame tube 31 has the same advantages—as mentioned above—as the arrangement of the container 24 in the breast tube 21. In the case of the arrangement of the container 24 in the top-frame tube 31, during assembly of the motorcycle frame 19 the container 24 or a portion thereof is introduced or inserted through an opening 33 (FIG. 4) into an inner recess 34 of the top-frame tube 31 where it is fixed in place, as will be referred to in more detail hereafter, and connected to the fuel tank 13 and the throttle valve device 9.

In the embodiments shown, the container 24, regardless of whether it is arranged in the top-frame tube 31 or in the breast tube 21, is arranged completely in the inner recess 34 or the motorcycle frame 19 and so also accommodated in such a way that it is protected against crashes and damage.

Figure 5:
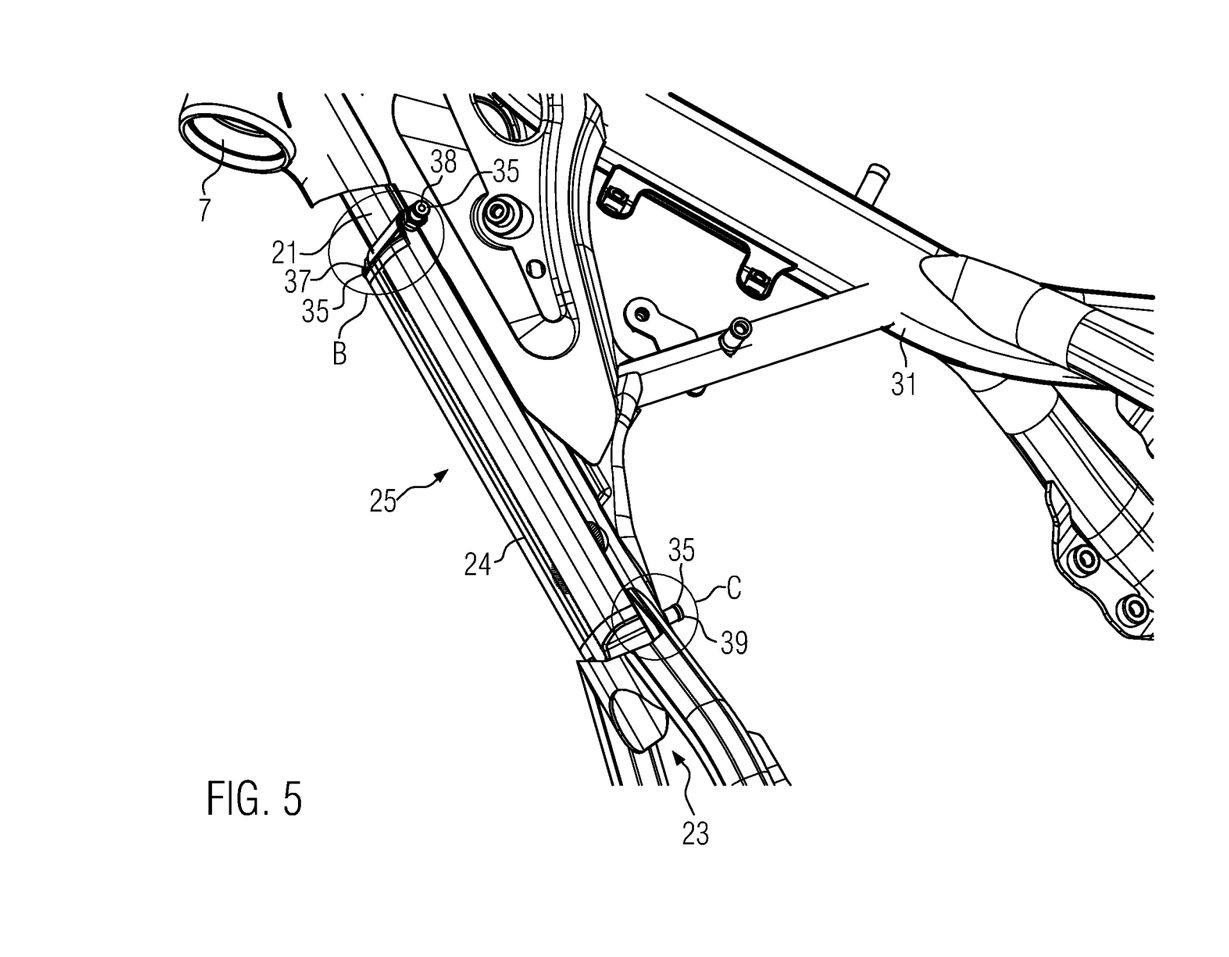
FIG. 5 is a perspective view of a detail of the motorcycle frame with the container arranged in the breast tube, having three screw fittings arranged on the container.

Reference is now made to FIG. 5 of the drawing, showing that the container 24 has an elongated shape and is completely accommodated in the inner recess 25 of the breast tube 21. The container 24 can be introduced into the inner recess 25 through the opening 23 and removed therefrom, for example should a replacement of the container 24 be necessary.

The container 24 can be pre-assembled together with the motorcycle frame 19 and in such a way that, during or after the production of the motorcycle frame 19, it is inserted through the opening 23 into the inner recess 25 of the breast tube 21. As the container 24 serves the function of receiving fuel vapor from the fuel tank 13 of the motorcycle 1, it must be fluidically connected to the fuel tank 13 so that vapor can be conveyed from the tank to the canister. For this purpose, a connection means in the form of a screw fitting 35 (FIG. 5) is provided on the container 24, to which a conveying or conducting means in the form of a hose or the like can be fixed, which is connected to the fuel tank 13. Accordingly, fuel vapor can pass from the fuel tank 13 through the above-mentioned hose into the container 24.

Figure 9:
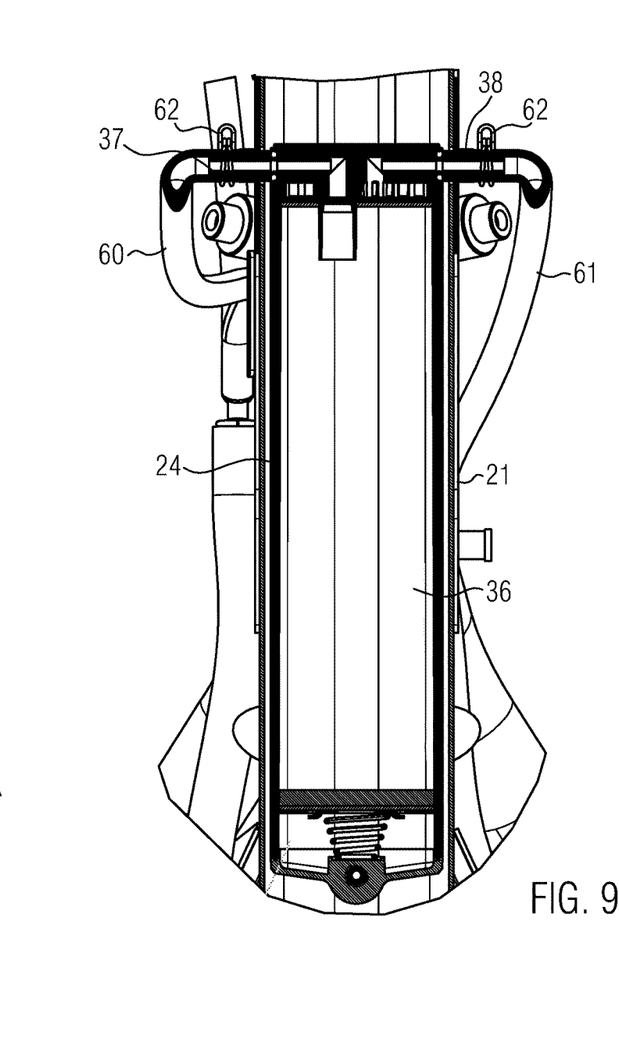
FIG. 9 is a view similar to that of FIG. 8, showing the arrangement of conducting means in the form of hoses for passing fuel vapor to the container and away from the container.

As seen in FIG. 5, the container 24 in the embodiment shown is provided with three separate screw fittings 35, which are fluidically connected to the internal space 36, apparent on the basis of FIG. 9 of the drawing, of the container 24. The screw fittings 35 can be screwed together with internally threaded sockets of a cover of the container in a fluid-tight manner, or else screwed into the lid with a self-tapping external thread and fixed thereto, forming a seal.

The screw fitting 37 (FIGS. 5, 8 and 9) is used for the fluid-conducting connection of the container 24 to the fuel tank 13, so that fuel vapor can be passed from the fuel tank 13 through the screw fitting 37 into the container 24. The screw fitting 38 is used for the fluid-conducting connection of the container 24 to a so-called purge valve, i.e. a valve device 40, which is visible in FIGS. 11A, 11B, and 11C, and is used to provide the controlled or regulated delivery of fuel vapor from the container 24 to the throttle valve device 9 (and thus to the combustion engine 8), in order to be supplied to the combustion process by the combustion engine 8.

A screw fitting 39 is used for the fluid-conducting connection of the internal space 36 of the container 24 to the atmosphere, to enable the container 24 to be flushed after the opening of the valve device 40, and to enable a pressure equalization with the internal space 36.

Figure 6:
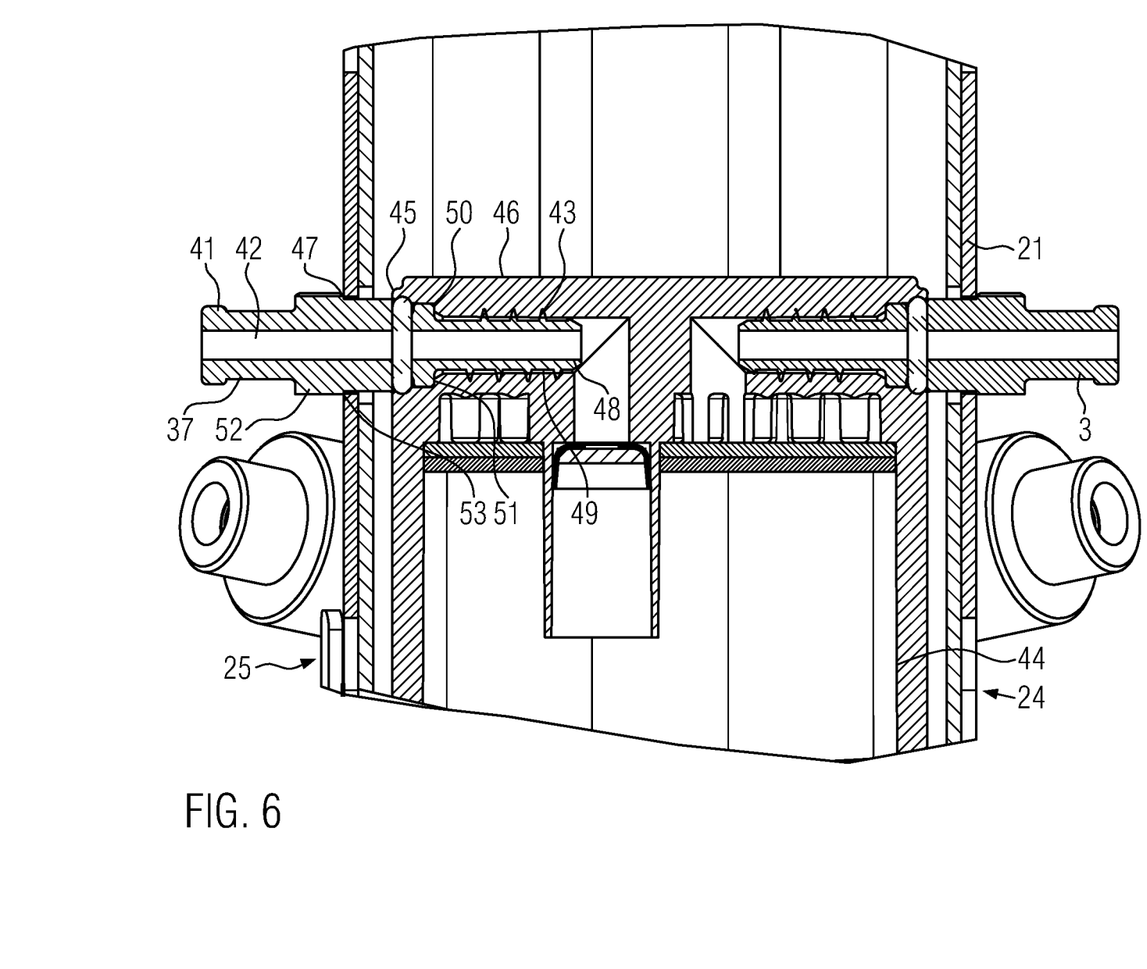
FIG. 6 is an enlarged view of the detail "B" from FIG. 5, showing the sealing arrangement of two screw fittings on the container.

FIG. 6 of the drawing shows an enlarged view of the detail "B" of FIG. 5, which shows the sealing arrangement of the two screw fittings 37 and 38 to a cover 46 of the container 24. The screw fitting 37 is in the form of a cylinder-shaped body 41 having an internal passage 42 and a self-tapping external thread 43. After the container 24, with its housing 44, has been introduced into the inner recess of the breast tube 21, and in such a way that an opening 45 of a cover 46 of the container housing 44 overlaps with a passage 47 of the breast tube 21, the screw fitting 37 can be inserted through the passage 47 so that the cylindrical section 48 fitted with the external thread 43 can be introduced through the opening 45 of the cover 46, into the cover 46, and comes into engagement with the cover 46. The housing 44 thus is provided with an opening 45, through the cover 46. The cover 46 preferably is fabricated, for example, from a plastic material, so that a rotary actuation of the screw fitting 37 ensures that the latter, due to its outer thread 43, is drawn into a passage 49 of the cover 46 in a self-tapping manner. This drawn insertion of fitting 37 is to such an extent that a union 50 of the screw fitting 37 comes into contact with a stop surface 51 of the passage 49, forming a fluid-tight sealing surface between the union 50 and the stop surface 51. At the same time, a union 52 of the screw fitting 37 comes into contact with, and can rest against, an outer mating surface 53 on the frame tube 20 of the passage 47, so that due to the seating of the union 52 on the mating surface 53, a positional fixing of the cover 46, and therefore also of the housing 44 of the container 24, which is connected to the cover 46, is obtained.

Using an arrangement of the screw fitting 38 on the cover 46, functionally identical to the arrangement of the screw fitting 37 on the cover 46, with the respective surfaces just described in detail, results in a further positional fixing of the container 24 in the breast tube 21. This eliminates the need to fix the container 24 in the breast tube 21 using additional retaining devices, because the use of the screw fittings 37, 38 enables both a positional fixing of the container 24, and also the formation of the sealing surfaces between the screw fittings 37, 38 and the cover 46.

The embodiment shown has dispensed with the configuration of the cover 46 with internally threaded sockets that can be brought into screwed engagement with screw fittings 37, 38, each fitted with an external thread. Nevertheless, it alternatively is also possible instead of screw fittings with a self-tapping external thread, to use such screw fittings that can come into contact with a screw fitting of the cover 46 which is fitted with a respective internal thread, thereby achieving a positional fixing of the container 24 in the breast tube 21; also by the contacting of a stop surface on the screw fitting 37, 38 (similar to the union 50), with a mating surface of the internally threaded socket of the cover, a fluid-tight configuration between the screw fitting and internally threaded socket is achieved.

Figure 7:
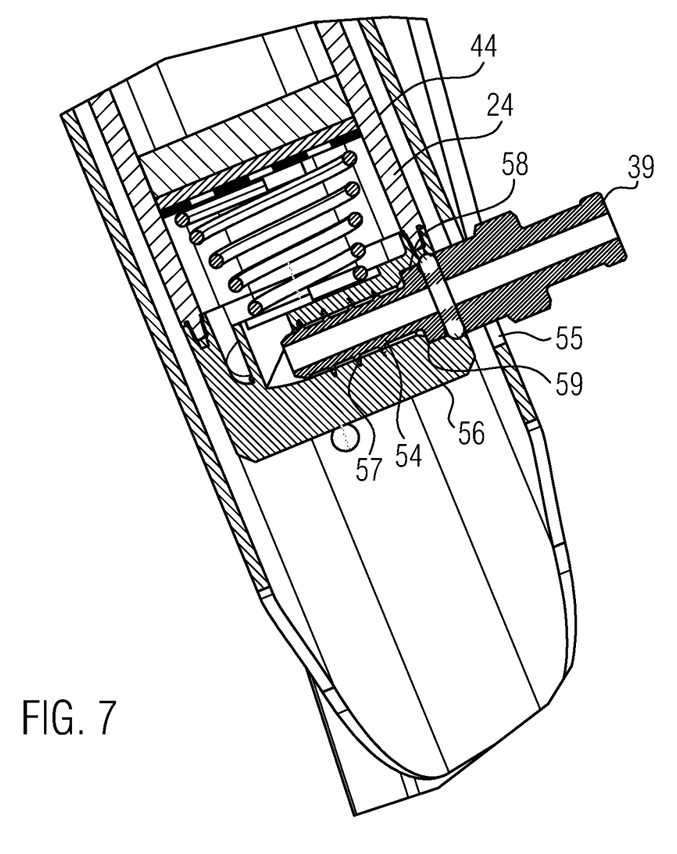
FIG. 7 is an enlarged view of the detail "C" from FIG. 5, showing the sealing arrangement of a third screw fitting on the container.

FIG. 7 shows the detail "C" according to FIG. 5 in an enlarged view. After the container 24 has been introduced into the inner recess 25 of the breast tube 21, the screw fitting 39 with its cylindrical section 54 can be introduced through a passage 55 in the breast tube 21 and into a lower housing section or cover 56 of the housing 44 of the container 24. A rotary activation of the screw fitting 39 leads to the fitting being drawn or screwed into the lower housing section or cover 56 by way of its self-tapping external thread 57, until a union 58 of the screw fitting 39 comes to rest on a mating surface 59 of the cover 56. A fluid-tight connection or configuration thus is formed between the union 58 and the mating surface 59.

Figure 8:
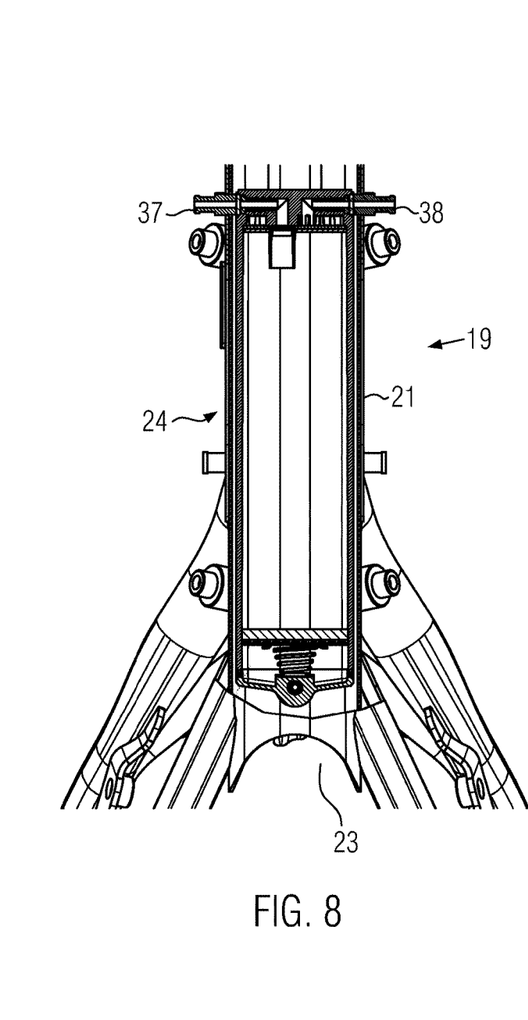
FIG. 8 is a front view of the motorcycle frame, showing an opening arranged on the breast tube of the motorcycle frame for receiving the container.

FIG. 8 of the drawing shows a front view of the breast tube 21 of the motorcycle frame 19 with the canister or container 24 arranged in the breast tube 21. The container 24 is formed to be shape- and surface-complementary to the frame tube 20 or breast tube 21, and defines an elongated configuration with the housing 44, in which the internal space 36 for accommodating the bulk material 72 of activated charcoal 73 (shown in FIG. 12A) is arranged. The internal space 36 receives the fuel vapor from the fuel tank 13, specifically via the screw fitting 37, and can discharge the fuel vapor via the screw fitting 38 again, so that the former is combusted by the combustion engine 8 of the motorcycle 1. The container 24 is therefore configured such that it can be fixed to the inner recess 25 of the breast tube 21 without the need for additional retaining devices, as is the case in many known motorcycles (which for fixing the container or canister requires separate tabs or the like, fixed to the motorcycle frame).

Attention is invited to FIG. 9, which shows a detail view similar to that of FIG. 8, with container 24 arranged in the breast tube 21. Conveying or conducting means, in the form of a first hose 60 and a second hose 61, are provided respectively on both of the screw fitting 37 and the screw fitting 38. The conducting means, e.g., two hoses 60, 61 may be detachably connected to the respective screw fitting by means of spring clamps 62. Through the first hose 60 fuel vapor can be passed or conveyed into the internal space 36 of the container 24, where it is received and stored by the bulk material 72 with activated charcoal 73, as shown in more detail in FIG. 12A. Through the second hose 61, the fuel vapor can then be unloaded or transported at a given point in time in the direction of the throttle valve device 9; for this purpose the valve device 9 is activated for opening by the engine control unit 11, so that the fuel vapor is transported away through the hose 61 to the combustion engine 8.

Figure 10:
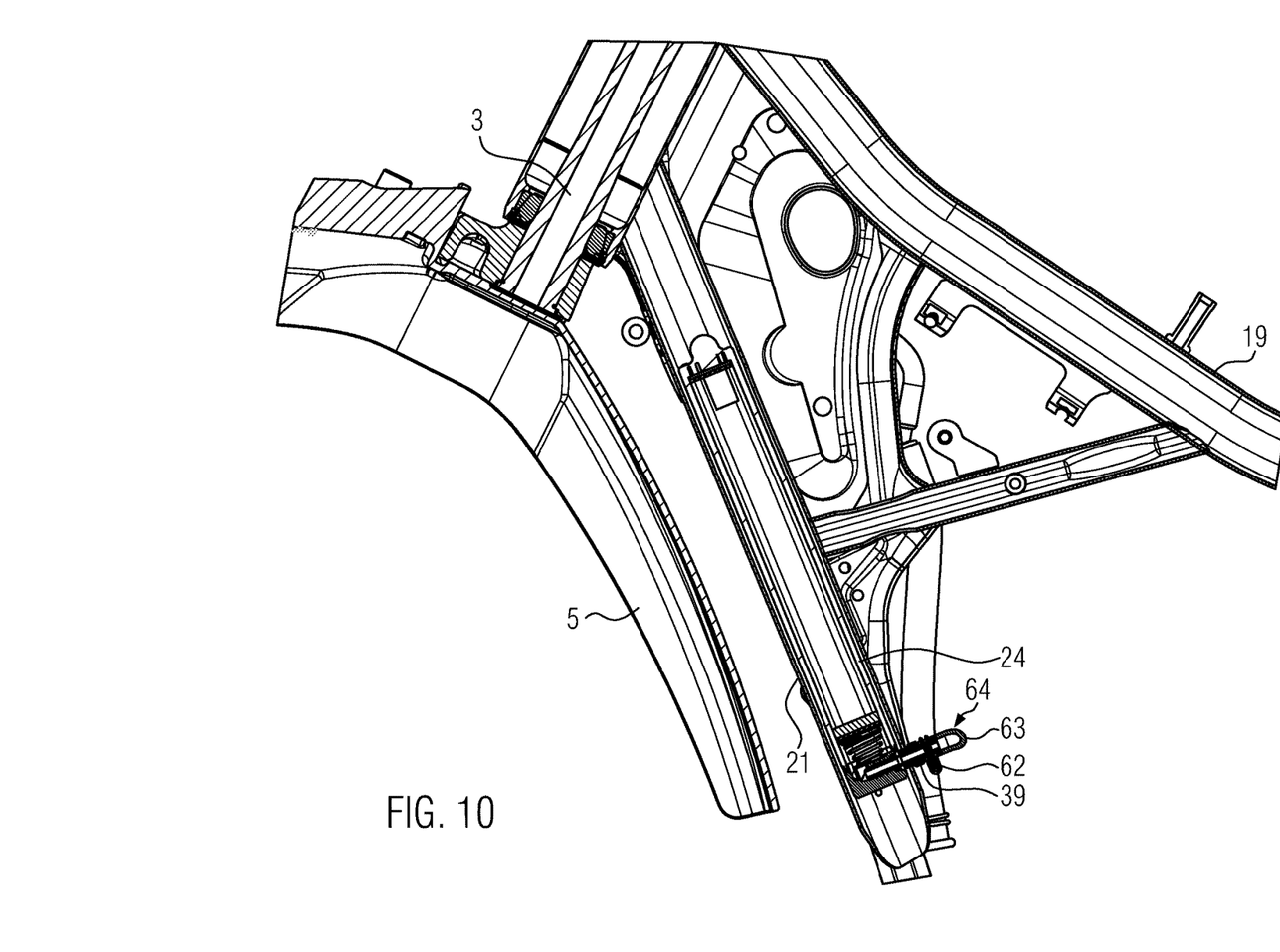
FIG. 10 is a view similar to the view of FIG. 9, showing the arrangement of conducting means in the form of a hose connected to the atmosphere for equalizing the pressure and for flushing the container.

FIG. 10 illustrates a side view of a detail of the motorcycle frame 19 with the container 24 arranged in the breast tube 21. In addition, the front mudguard 5 and a section of the front fork 3 are shown. The lower screw fitting 39 is connected to a conducting means in the form of a hose 63, where it is detachably fixed using a spring clamp 62. The end of this hose 63 opposite the connection region 64 is fixed to the motorcycle frame 19 and has one end which is open to the atmosphere, so that when the valve mechanism 40 is opened, ambient air can flow back into the internal space 36 of the container 24, namely through a one-way valve that prevents the escape of fuel vapor from the container 24 through the hose 63 into the atmosphere.

Figures 11A, 11B:
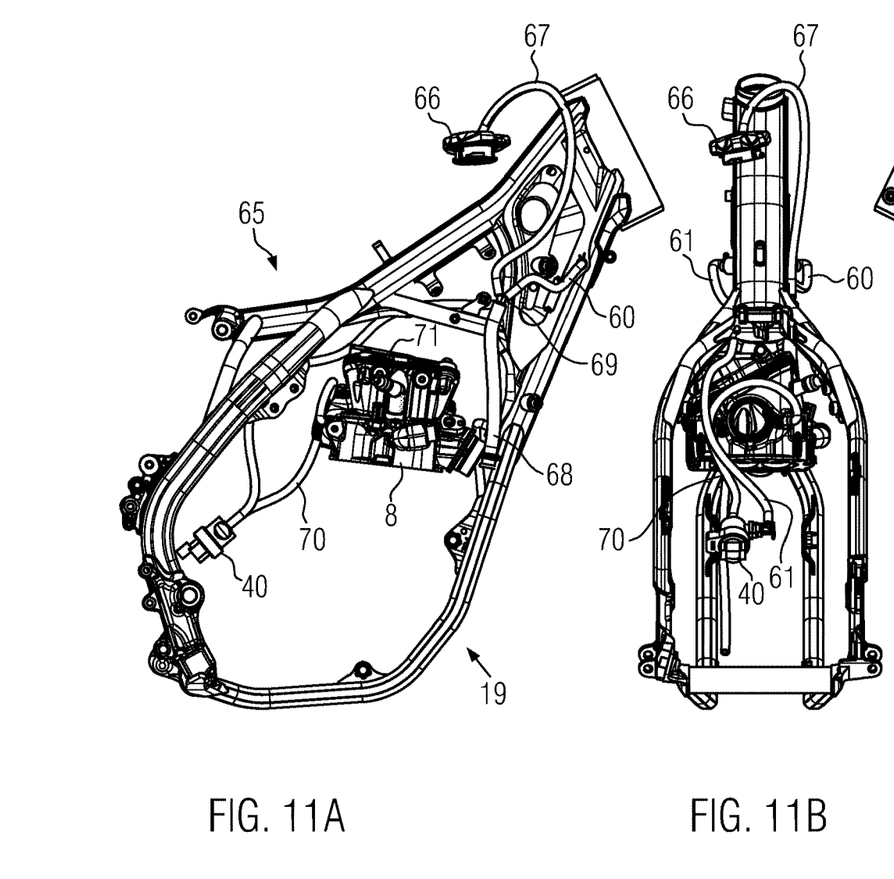
FIGS. 11A, 11B, and 11C are views of the motorcycle frame from the right-hand side (FIG. 11A), of the motorcycle frame from above (FIG. 11B), and of the motorcycle frame from the left-hand side (FIG. 11C), illustrating the arrangement of conducting means in the form of hoses for passing fuel vapor to the container and away from the container and for connecting the container to the atmosphere.
Figure 11C:
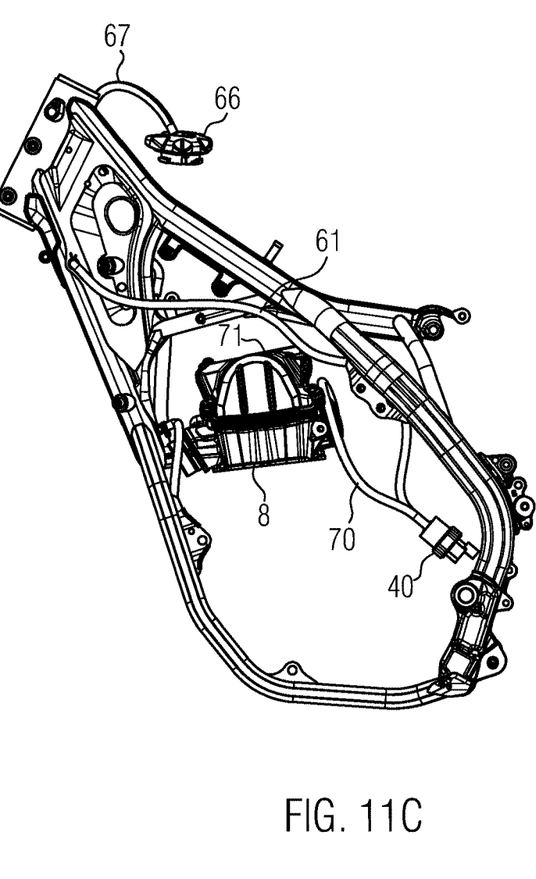

FIG. 11A shows a right-side view of the motorcycle frame 19, with the conduit arrangement 65 in the form of hoses, some of which have already been mentioned above. Also shown is a cover 66 of the fuel tank 13, with a cover hose 67 (which is arranged on the cover) which firstly is used for conveying and passing fuel vapor out of the fuel tank 13 and, secondly, merges into an overflow hose 68, namely at a Y-piece 69, to which the first hose 60 is connected for passing fuel vapor into the container 24.

FIG. 11B shows a top view of the motorcycle frame 19 with the second hose 61, which is used for passing fuel vapor out of the container 24 in the direction of the purge valve or the valve device 40. As mentioned above, the valve device 40 can be activated by the engine control unit 11 to open and close. Due to the vacuum resulting from the running of the engine 8, which is forwarded via the throttle valve device 9 and the hose 70 to the valve device 40, and from there via the hose second 61 and the hose fitting 38 into the interior 36 of the container 24, fuel vapor continues to be forwarded to the engine or the combustion engine 8 to be burned. This occurs, for example, when the throttle valve of the throttle valve device 9 is closed or only slightly open, since at such an operating point, due to the running of the engine 8 (of which the FIGS. 11A, 11B, 11C only show an upper section with the cylinder head 71), a high vacuum is created.

Figure 12A:
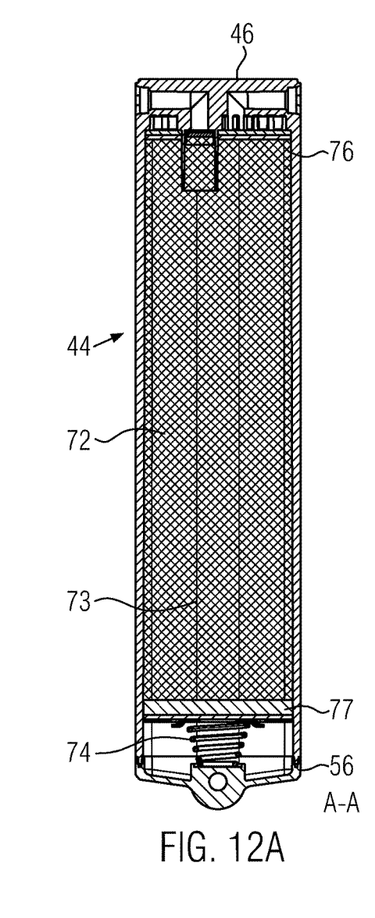
FIGS. 12A, 12B, and 12C are views from the front (FIG. 12A) in the section A-A according to FIG. 12B, from the side (FIG. 12B), and a perspective view of the container.
Figure 12B:
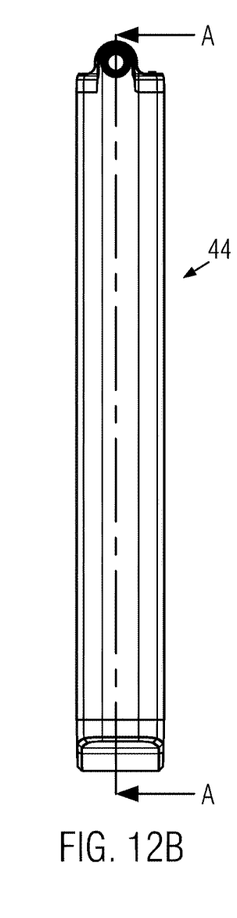

FIG. 12A shows a sectional view at the section A-A of FIG. 12B of the container 44. The container is shown with the top cover 46 and a lower cover 56, and with the dry bulk material 72 with activated charcoal 73 which is used for receiving the fuel vapor from the fuel tank 13. A screw pressure spring 74 arranged in the cover 56 is used as a compensating element for any volume changes of the bulk material 72 in the container 24. The activated charcoal 73 can undergo volume changes during its operating period, and the biasing action of screw pressure spring 74 ensures that the bulk material 72 remains compact despite such volume changes; the bulk material 72 is not present in the container 24 as loose, but rather as compacted, bulk material.

Figure 12C:
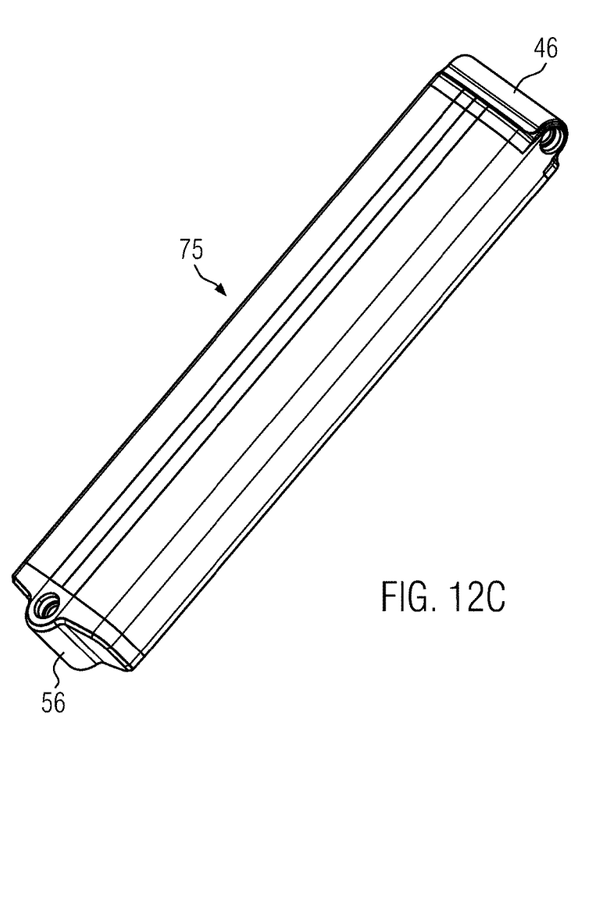

From FIG. 12B and FIG. 12C, it is seen that overall the housing 44 of the container 24 has an elongated configuration with a rectangular cross section, and a sleeve-shaped body 75 forming the housing 44, in which both the upper cover 46 as well as the lower cover 56 are used to close off the body 75 on both sides. In the upper end region near to the cover 46, the body 75 comprises a plate 76, which prevents escape of the activated charcoal 73 from the internal space 36 via the passage 49; at the lower end region near to the cover 56 a plate 77 performs the same function.

With regard to features of the apparatus system not described in detail individually, express reference is made to the patent claims and the drawing.

REFERENCE LIST 1 motorcycle
2 front wheel
3 front fork
4 front brake
5 mudguard
6 handlebar
7 steering head bearing tube
8 internal combustion engine
9 throttle valve device 10 fuel injection system
11 engine control unit
12 seat
13 fuel tank
14 exhaust pipe
15 silencer
16 transmission
17 drive chain
18 rear wheel
19 motorcycle frame
20 frame tube
21 breast tube
22 underslung frame tube
23 opening, recess
24 canister
25 inner recess
26 longitudinal axis
27 end region
28 end region
29 frame tube
30 swinging-fork pivot tube
31 top-frame tube
32 end region
33 opening
34 inner recess of the top-frame tube
35 screw fitting
36 internal space
37 screw fitting
38 screw fitting
39 screw fitting
40 purge valve, valve device
41 cylindrical body
42 internal passage
43 external thread
44 housing
45 opening
46 cover
47 passage
48 section
49 passage
50 union
51 stop surface, mating surface
52 union
53 mating surface
54 section
55 passage
56 cover
57 external thread
58 union
59 mating surface
60 hose
61 hose
62 spring clamp
63 hose
64 connection area
65 conduit arrangement
66 cover
67 hose
68 overflow hose
69 Y-piece
70 hose
71 cylinder head
72 bulk material
73 activated charcoal
74 screw pressure spring
75 body
76 plate
77 plate Although the invention has been described in detail with particular reference to these preferred embodiments, other embodiments can achieve the same results. In the previous description, specific details are set forth, such as specific materials, structures, processes, etc., in order to provide a thorough understanding of the present invention. However, as one having ordinary skill in the art would recognize, the present invention can be practiced without resorting to the details specifically set forth.

Only some embodiments of the invention and but a few examples of its versatility are described in the present disclosure. It is understood that the invention is capable of use in various other combinations and is capable of changes or modifications within the scope of the inventive concept as expressed herein. Modifications of the invention will be obvious to those skilled in the art, and it is intended to cover in the appended claims all such modifications and equivalents. The entire specifications of all patent publications cited hereinabove are hereby incorporated by reference.

What is claimed is:

1. A motorcycle having a combustion engine and a throttle valve device, comprising:
a fuel tank and a canister for receiving fuel vapor from the fuel tank;
a conduit arrangement for passing fuel vapor from the fuel tank to the canister and from the canister to the throttle valve device; and
a motorcycle frame with at least one frame tube, the at least one frame tube defining an inner recess and an opening through which at least a portion of the canister is insertable;
wherein at least a portion of the canister is arranged in the inner recess of the frame tube.

2. The motorcycle according to claim 1, wherein the canister defines a surface that is shape- and surface-complementary to an interior surface of the inner recess of the frame tube.

3. The motorcycle according to claim 1, wherein the canister defines a surface that is shape- and surface-complementary to an interior surface of the inner recess of the frame tube.

4. The motorcycle according to claim 3, wherein:
the canister comprises a housing having a housing inner recess;
the housing defines an elongated shape;
the housing inner recess is closable with a cover at at least one end region of the housing; and
the housing is provided with at least one opening for the intake or escape of fuel vapor.

5. The motorcycle according to claim 4, wherein:
the canister is fitted with at least one connection device for receiving a connection means connectable to a conducting means of the conduit arrangement; and
the connection means is configured for arrangement through a passage of the frame tube for engagement with the connection device.

6. The motorcycle according to claim 5, wherein the connection means comprises a screw fitting, the screw fitting comprising:
an internal passage;
an external thread fixable in the connection device with a fluid-tight seal; and
a union contactable against a mating surface of the frame tube.

7. The motorcycle according to claim 6, wherein the canister comprises an outer contour configured for fixing to the inner recess of the frame tube without an additional retaining device.

8. The motorcycle according to claim 7, wherein the canister comprises:
an internal space accommodating a bulk material with activated charcoal;
a passage for the entry of fuel vapor into the bulk material;
a passage for the escape of fuel vapor from the bulk material; and
a passage for the fluidic connection of the internal space to the atmosphere.

9. The motorcycle according to claim 1, wherein:
the canister comprises a housing having a housing inner recess;
the housing defines an elongated shape;
the housing inner recess is closable with a cover at at least one end region of the housing; and
the housing is provided with at least one opening for the intake or escape of fuel vapor.

10. The motorcycle according to claim 1, wherein:
the canister is fitted with at least one connection device for receiving a connection means connectable to a conducting means of the conduit arrangement; and
the connection means is configured for arrangement through a passage of the frame tube for engagement with the connection device.

11. The motorcycle according to claim 1, wherein the canister comprises an outer contour configured for fixing to the inner recess of the frame tube without an additional retaining device.

12. The motorcycle according to claim 1 wherein the inner recess of the frame tube defines a rectangular-shaped cross-section.

13. The motorcycle according to claim 1, wherein the canister comprises:
an internal space accommodating a bulk material with activated charcoal;
a passage for the entry of fuel vapor into the bulk material;
a passage for the escape of fuel vapor from the bulk material; and
a passage for the fluidic connection of the internal space to the atmosphere.

14. The motorcycle according to claim 13, wherein the motorcycle frame comprises a steering head bearing tube, and wherein the at least one frame tube extends away from the steering head bearing tube, and wherein the at least one frame tube defines the inner recess in which the canister is arranged.

15. The motorcycle according to claim 1, wherein the motorcycle frame comprises a steering head bearing tube, and wherein the at least one frame tube extends away from the steering head bearing tube, and wherein the at least one frame tube defines the inner recess in which the canister is arranged.

16. The motorcycle according to claim 15, wherein the motorcycle frame comprises:
a breast tube having the inner recess; and
a top-frame tube having a second inner recess;
wherein the canister is arranged in at least one of the breast tube and the top-frame tube.

17. The motorcycle according to claim 1, wherein the motorcycle frame comprises:
a breast tube having the inner recess; and
a top-frame tube having a second inner recess;
wherein the canister is arranged in at least one of the breast tube and the top-frame tube.

18. The motorcycle according to claim 1, wherein the motorcycle frame comprises a breast tube having the inner recess, wherein the canister is arranged in the breast tube.

19. The motorcycle according to claim 1, wherein the motorcycle frame comprises a top-frame tube having the inner recess, wherein the canister is arranged in the top-frame tube.

* * * * *